(12) United States Patent
Cheng

(10) Patent No.: US 6,347,889 B1
(45) Date of Patent: Feb. 19, 2002

(54) ADAPTER FOR AN OPTICAL FIBER CABLE

(76) Inventor: Yu-Feng Cheng, No. 7, Fuhsing St., Tucheng Ind. Dist., Tucheng City, Taipei Hsien (TW)

(*) Notice: Subject to any disclaimer, the term of this patent is extended or adjusted under 35 U.S.C. 154(b) by 0 days.

(21) Appl. No.: 09/531,664

(22) Filed: Mar. 20, 2000

(51) Int. Cl.$^7$ .................................. G02B 6/38
(52) U.S. Cl. ........................... 385/60; 385/56
(58) Field of Search ............... 385/60, 56, 78, 385/59, 55, 76, 77, 86

(56) References Cited

U.S. PATENT DOCUMENTS 6,024,498 A * 2/2000 Carlisle et al. ............... 385/56

* cited by examiner

Primary Examiner—Phan T. H. Palmer
(74) Attorney, Agent, or Firm—Dellett and Walters

(57) ABSTRACT

An adapter with a 3.5φ plug end and a toslink socket end for receiving a toslink-type plug carrying an optical fiber cable. The socket includes a bore, and a square counter bore defined by four straight sidewalls of equal length and height. Each straight sidewall includes a longitudinal channel sized to slidably receive one of two opposed longitudinal ridges of the toslink plug, and a transverse slot in communication with the respective channel and sized to receive one of two resilient transverse ribs of the toslink plug. The adapter can receive the toslink plug in four different positions by turning the plug 90° about its longitudinal axis prior to its insertion in the adapter.

8 Claims, 6 Drawing Sheets

ADAPTER FOR AN OPTICAL FIBER CABLE

BACKGROUND OF THE INVENTION

1. Field of the Invention

The invention relates to an improved adapter for an optical fiber plug, and especially to an adapter which can receive a toslink-type plug in more than one position, and which can be made wholly or partly from plastic.

2. Description of Related Art

Optical fiber cables are becoming increasingly important in the world of information technology because of their high capacity for carrying information, as well as having an extremely low distortion rate on the information carried. Currently, two types of plug, the toslink and the 3.5φ, are being used to connect optical fiber cables with hardware, and adapters must be used when the hardware does not have the appropriate socket for the plug carrying the optical fiber. The current invention is directed towards an adapter with a male 3.5φ end and a female toslink end.

Referring to FIGS. 6 and 7, a prior art adapter (60) for receiving a toslink plug (70) includes a bore (62), a counter bore (61), and a male 3.5φ end for connection with hardware requiring information via an optical fiber. The counter bore (61) includes two opposed straight sidewalls each with a longitudinal channel (63) defined therealong. A third straight sidewall extending between the opposed sidewalls includes one of two slots (65) extending from the counter bore (61) to an outer periphery of the adapter (60). Two inclined faces are respectively formed between the third straight sidewall and the opposed sidewalls. A fourth straight sidewall extends between bottoms of the opposed sidewalls and includes the second slot (65) (not shown).

The toslink plug (70) includes a hollow projection and a pin (72) extending through and out of an open end of the projection. Two opposed straight outer walls each have a longitudinal ridge (73) which are slidably received in a respective one of the longitudinal channels (63). Two inclined edges (71) are respectively formed at tops of the outer walls and lead to a top face. The inclined edges (71) and the top face respectively mate with inclined faces and the third straight sidewall of the adapter (60). A bottom face extends between bottoms of the opposed straight sidewalls. The top face and bottom face each has a resilient rib (74) transversely formed thereon and sized to be received in the respective slots (65) when the plug (70) is fitted in the adapter (60). The pin (72) is fitted to an end of a fiber optic cable (720), and is slidably received in the bore (62).

The plug (70) can only be fitted in the adapter (60) when the longitudinal ridges (73) and longitudinal channels (63), inclined edges (71) and inclined faces, transverse ridges (74) and slots (65), and bottom face and fourth straight side wall are respectively aligned, ie, there is only one position.

Two difficulties frequently arise with the prior art adapters:

1. A user cannot always clearly see the adapter to receive the toslink plug, and as the plug can only be fitted in one position in the adapter, a lot of time and patience can be spent trying to engage the optical fiber cable with the hardware.
2. In addition to the frustration experienced in trying to fit the toslink plug, damage may occur through misalignment between the plug and the adapter, by which information carried along the optical fiber cable will be distorted, possibly leading to very serious errors. Thus, there is a long and unfulfilled need for an adapter which can easily receive in more than one position a toslink optical fiber plug.

SUMMARY OF THE INVENTION

The main objective of the invention is to provide an improved adapter for an optical fiber cable whereby a plug, especially a toslink type plug, can be fitted in the adapter in more than one position whereby time and patience can be saved, as well as providing damage-prevention measure to the plug.

A second objective is to provide an improved adapter for an optical fiber cable whereby the adapter can be wholly or partly made from plastics.

The adapter has a body with a 3.5φ type plug at a first end, and a toslink-type socket at a second end. A bore is defined in the body and a square counter bore communicates with the bore. The counter bore has four straight sidewalls, and each straight sidewall includes a longitudinal channel and a slot formed perpendicular to the channel and in communication therewith.

The straight sidewalls, bore, counter bore, longitudinal channels and slots of the body are sized to slidably retain a toslink plug in such a way that the adapter can be quickly and easily fitted with the plug and can be rotated in increments of 90°, in relation to a longitudinal axis thereof, thereby avoiding potential damage through possible misalignment between the plug and adapter.

Other objects, advantages and novel features of the invention will become more apparent from the following detailed description when taken in conjunction with the accompanying drawings.

DETAILED DESCRIPTION OF THE PREFERRED EMBODIMENT

Figure 1:
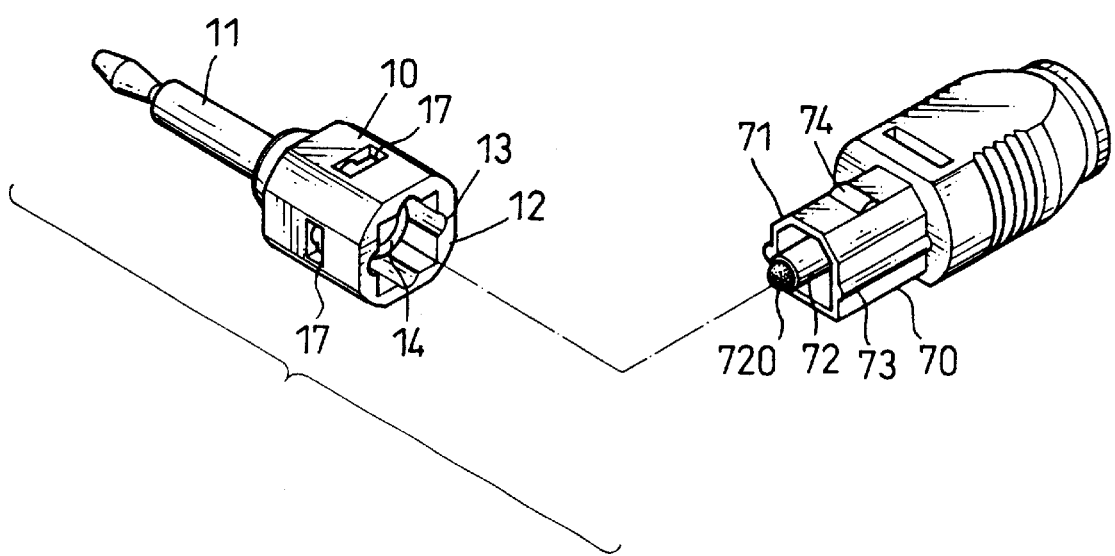
FIG. 1 is a perspective view of an improved adapter for a toslink plug for a fiber optic cable, and a toslink plug.
Figure 2:
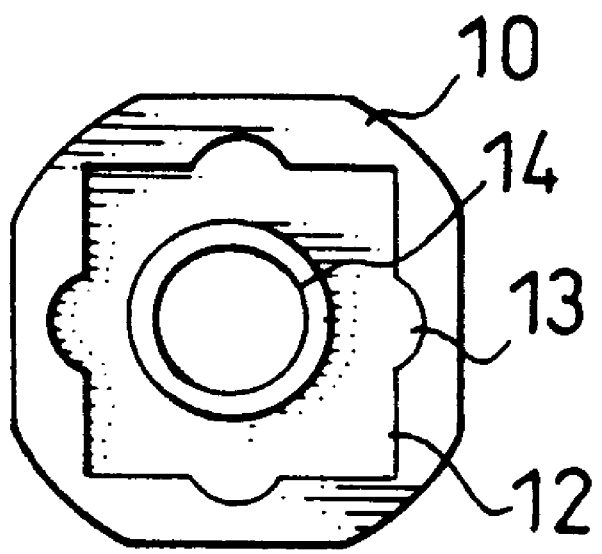
FIG. 2 is an end view of the improved adapter as shown in FIG. 1.
Figure 3:
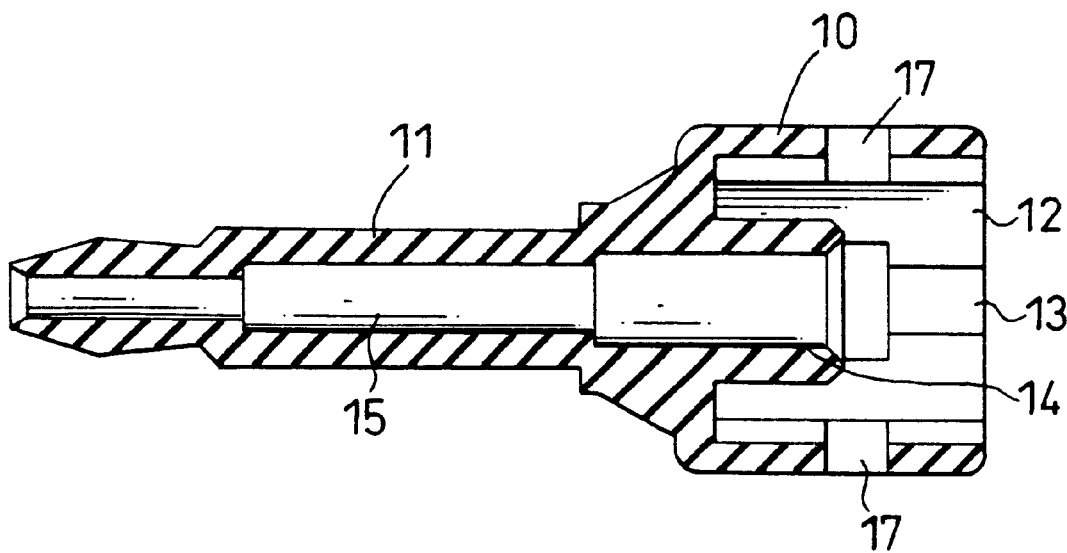
FIG. 3 is a cross-sectional side view of the improved adapter shown in FIG. 1.

FIGS. 1, 2 and 3 show an improved adapter (10), for use with an optical fiber cable fitted with a toslink plug (70) which does not form part of the claimed invention but is repeated in detail here to assist in the understanding of the description.

The toslink plug (70) includes a hollow projection through which a pin (72) extends and protrudes therefrom. The pin (72) houses a distal end of an optical fiber cable (720). The projection has two opposed straight faces, a bottom face, two inwardly inclined upper edges (71) respectively extending from tops of the straight faces, and a top face extending between the upper edges (71). Two longitudinal ridges (73) are respectively formed on the opposed straight faces. A resilient rib (74) is transversely formed on each of the top face and the bottom face. A distance across the opposed straight faces is equal to a distance across the top face and the bottom face.

The adapter (10) comprises a hollow body with a 3.5φ-type male end (11) integrally extending from a first end thereof, and a toslink-type socket with an opening defined in a second end thereof. The toslink-type socket defines a bore (14), and a counter bore (12). The bore (14) is sized to receive the pin (72), and includes a central portion (15). The counter bore (12) is square with four inner walls when viewed from an end thereof and is dimensioned to receive the projection of the toslink plug in four positions by rotating the plug 90° about a longitudinal axis thereof each time. Each inner wall has a longitudinal channel (13) defined therein which is sized to receive one of the longitudinal ridges (73) therein when appropriate. Each inner wall further defines a transverse slot (17) sized to receive one of the resilient ribs (74) when appropriate.

In assembly, the pin (72) is inserted first through the counter bore (12) and then into the bore (14), while simultaneously the longitudinal ridges (73) enter an opposed pair of the longitudinal channels (13), until the ribs (74) are deformed downward until they reach a respective one of the slots (17) where they resume their pre-deformed status, whereby the plug (70) is securely yet removably retained in the adapter (10). The plug (70) can be inserted in four different positions in the adapter (10) by rotating it 90° about the longitudinal axis thereof. The male end (11) is fitted in a 3.5φ-type socket in the hardware to receive information via the optical fiber cable.

Figure 4:
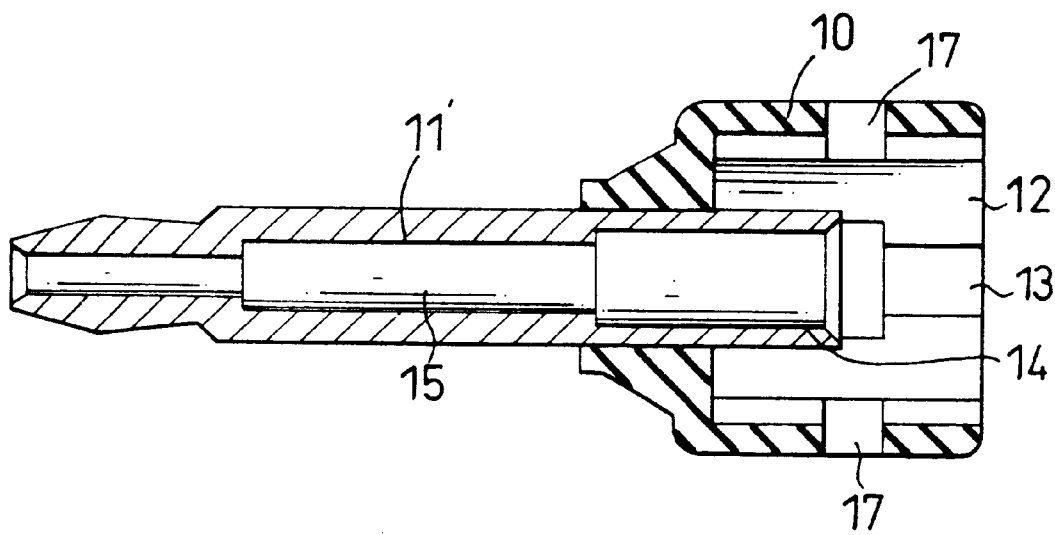
FIG. 4 is a cross-sectional side view of a second embodiment of the improved adapter as shown in FIG. 1.

In a second embodiment as shown in FIG. 4, the male end (11') is formed separately from the body and is fitted thereto. The first embodiment is made entirely from plastics, but in the second embodiment the male end (11') is made of metal and the remainder of the adapter (10) is made of plastics.

Figure 5:
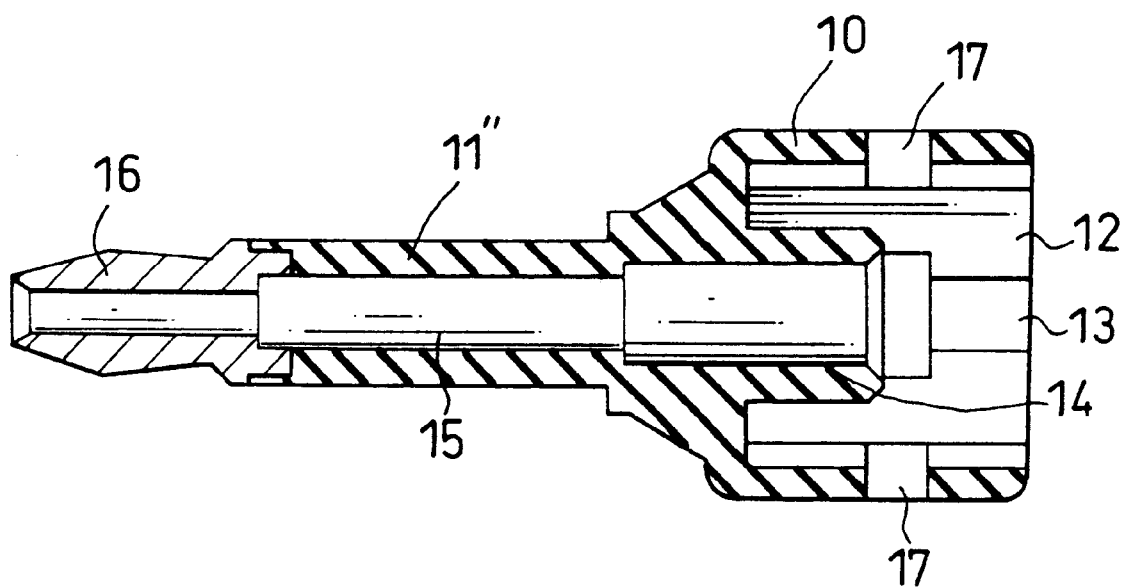
FIG. 5 is a cross-sectional side view of a third embodiment of the improved adapter shown in FIG. 1.
Figure 6:
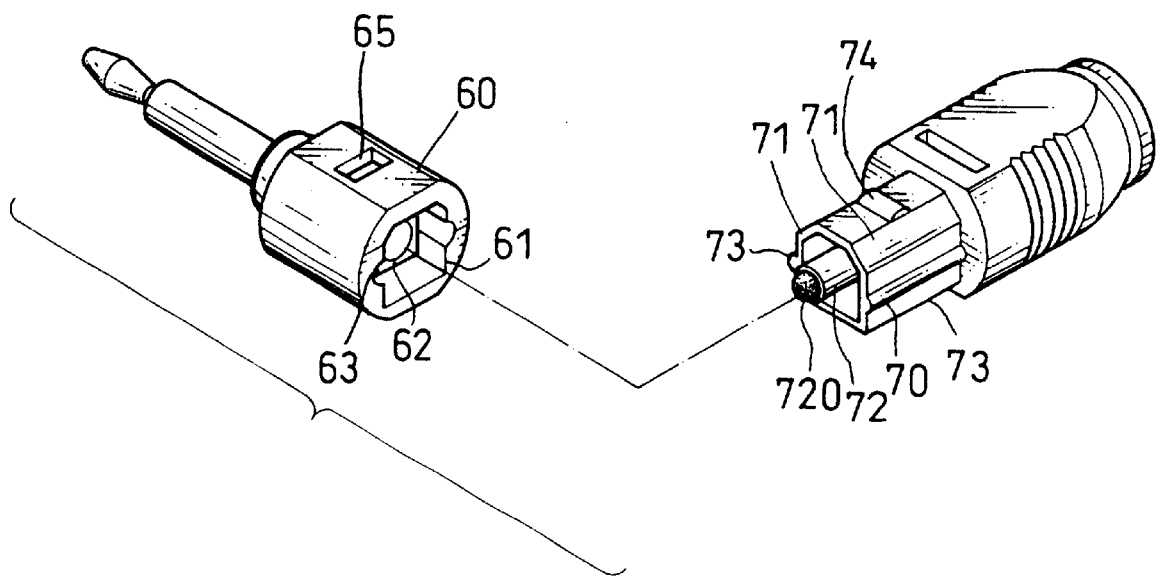
FIG. 6 is a perspective view of a prior art adapter for a toslink plug, and a toslink plug.
Figure 7:
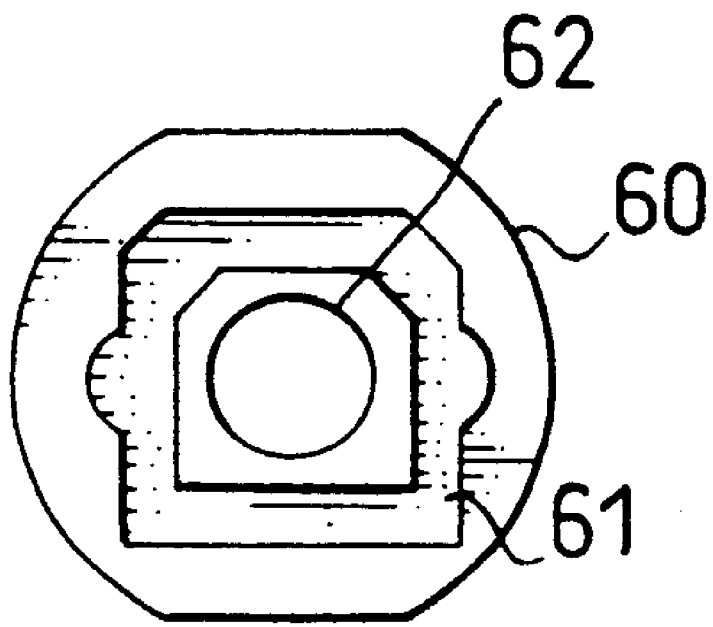
FIG. 7 is an end view of the prior adapter shown in FIG. 6.

In a third embodiment as shown in FIG. 5, the male end (11") has a distal tip (16) formed separately from the remainder thereof and is fitted thereto. The distal tip (16) is made of metal and the remainder of the adapter (10) is made of plastics.

The adapter (10) of the present invention has the following advantages:

1. it can receive in four different positions the toslink-type plug, thereby enabling quick and easy accomplishment of connecting an optical fiber with hardware which has only a 3.5φ-type socket; and
2. potential damage to the plug through possible misalignment between the plug and the adapter is avoided.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An improved adapter with a 3.5φ male end and a toslink-type female end for receiving a toslink-type plug carrying an optical fiber cable, the plug including a projection, two opposed longitudinal ridges and two transverse ribs formed perpendicular to the ridges, wherein the improved adapter comprises:

a body defining a bore and a counter bore, the counter bore being defined by four straight sides of equal length and height sized to slidably receive therein the projection, each of the straight sides including a longitudinal channel defined in a center thereof and sized to receive one of the longitudinal ridges, and a slot sized to snappingly receive one of the transverse ribs, whereby the plug can be received in the adapter in four different positions by turning the plug 90° about its longitudinal axis to the next position.

2. The improved adapter as claimed in claim 1, wherein each of the slots extends from the counter bore to an outer periphery of the adapter.

3. The improved adapter socket as claimed in claim 1, wherein each of the slots transversely communicates with the respective longitudinal channel.

4. The improved adapter as claimed in claim 1, wherein the 3.5φ male end is integrally formed with the body.

5. The improved adapter as claimed in claim 1, wherein the 3.5φ male end is formed separately from the body and is fitted thereto.

6. The improved adapter as claimed in claim 5, wherein the 3.5φ male end is made of metal and the remainder of the adapter is made of plastics.

7. The improved adapter as claimed in claim 1, wherein the 3.5φ male end has a distal tip formed separately from the remainder thereof and is fitted thereto.

8. The improved adapter as claimed in claim 7, wherein the distal tip of the 3.5φ male end is made of metal and the remainder of the adapter is made of plastics.

* * * * *